US010428188B2

(12) United States Patent
Miyazaki et al.

(10) Patent No.: US 10,428,188 B2
(45) Date of Patent: Oct. 1, 2019

(54) METHOD FOR PRODUCING MASTER BATCH, MASTER BATCH OBTAINED BY SAID PRODUCTION METHOD, RUBBER COMPOSITION FOR TIRE, AND PNEUMATIC TIRE

(71) Applicants: SUMITOMO RUBBER INDUSTRIES, LTD., Kobe-shi, Hyogo (JP); NIPPON PAPER INDUSTRIES CO., LTD., Tokyo (JP)

(72) Inventors: Sumiko Miyazaki, Kobe (JP); Takahiro Mabuchi, Kobe (JP); Takafumi Kawasaki, Tokyo (JP); Takeshi Nakayama, Tokyo (JP); Takeshi Fujii, Tokyo (JP)

(73) Assignees: SUMITOMO RUBBER INDUSTRIES, LTD., Kobe-Shi, Hyogo (JP); NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 15/547,215

(22) PCT Filed: Feb. 9, 2016

(86) PCT No.: PCT/JP2016/053767
§ 371 (c)(1),
(2) Date: Jul. 28, 2017

(87) PCT Pub. No.: WO2016/136453
PCT Pub. Date: Sep. 1, 2016

(65) Prior Publication Data
US 2018/0016402 A1 Jan. 18, 2018

(30) Foreign Application Priority Data

Feb. 26, 2015 (JP) .................................. 2015-036883

(51) Int. Cl.
| | | |
|---|---|---|
| *C08J 3/22* | (2006.01) | |
| *B60C 1/00* | (2006.01) | |
| *C08L 7/00* | (2006.01) | |
| *C08L 7/02* | (2006.01) | |
| *C08L 9/00* | (2006.01) | |
| *C08L 15/02* | (2006.01) | |
| *C08K 7/02* | (2006.01) | |

(52) U.S. Cl.
CPC .................. *C08J 3/226* (2013.01); *B60C 1/00* (2013.01); *C08J 3/22* (2013.01); *C08L 7/00* (2013.01); *C08L 7/02* (2013.01); *C08L 9/00* (2013.01); *C08L 15/02* (2013.01); *C08J 2307/00* (2013.01); *C08J 2307/02* (2013.01); *C08J 2309/00* (2013.01); *C08J 2401/02* (2013.01); *C08K 7/02* (2013.01); *C08L 2205/02* (2013.01); *C08L 2205/03* (2013.01); *C08L 2205/06* (2013.01); *C08L 2205/16* (2013.01); *C08L 2310/00* (2013.01)

(58) Field of Classification Search
CPC . C08J 3/22; C08J 3/226; C08J 2307/02; C08J 2309/10; C08J 2401/02; C08L 7/02; C08L 9/10; C08L 2310/00; C08L 2205/16
USPC ........................................................ 523/351
See application file for complete search history.

(56) References Cited

U.S. PATENT DOCUMENTS

| | | | | |
|---|---|---|---|---|
| 3,887,532 A | * | 6/1975 | Neubert ..................... | C08C 1/15 266/241 |
| 2016/0009877 A1 | * | 1/2016 | Takaoka ..................... | B60C 1/00 524/575.5 |
| 2018/0002494 A1 | * | 1/2018 | Kawamoto ............... | B29B 7/56 |

FOREIGN PATENT DOCUMENTS

| | | | |
|---|---|---|---|
| JP | 6-329838 | A | 11/1994 |
| JP | 11-005804 | A | 1/1999 |
| JP | 2009-13197 | A | 1/2009 |
| JP | 2009-197122 | A | 9/2009 |
| JP | 4581116 | B2 | 11/2010 |
| JP | 2013-18918 | A | 1/2013 |
| JP | 2013-043956 | A | 3/2013 |
| JP | 2013-129767 | A | 7/2013 |
| JP | 2013-177540 | A | 9/2013 |
| JP | 2013-241586 | A | 12/2013 |
| JP | 2014-125607 | A | 7/2014 |
| JP | 2014-139303 | A | 7/2014 |
| JP | 2014-141637 | A | 8/2014 |
| JP | 2014-141658 | A | 8/2014 |
| JP | 2014-227484 | A * | 8/2014 ................ C08J 3/20 |
| JP | 2015-93882 | A | 5/2015 |
| JP | 2015-98576 | A | 5/2015 |

(Continued)

OTHER PUBLICATIONS

Machine translation of Detailed Description of JP 2014-227484A; publication date: Aug. 2014.*

(Continued)

*Primary Examiner* — Fred M Teskin

(74) *Attorney, Agent, or Firm* — Birch, Stewart, Kolasch & Birch, LLP

(57) ABSTRACT

The present invention provides, inter alia, a method for producing a masterbatch in which the dispersibility of microfibrillated plant fibers is further increased to obtain excellent processability and improved rubber properties such as fuel economy, tensile strength, and elongation at break. The present invention relates to a method for producing a masterbatch, the method including step (I) of mixing a rubber latex with microfibrillated plant fibers oxidized with an N-oxyl compound to obtain a mixture, and coagulating the mixture by adjusting its pH to 2 to 6.

5 Claims, 1 Drawing Sheet

(56) References Cited

FOREIGN PATENT DOCUMENTS

WO      WO 2014/142316      *   9/2014   ................ C08J 3/20

OTHER PUBLICATIONS

Machine translation of JP-2009-197122-A, published Sep. 3, 2009 (machine translation and Japanese versions attached).
Machine translation of JP-2013-129767-A, published Jul. 4, 2013 (machine translation and Japanese versions attached).
Machine translation of JP-2013-18918-A, published Jan. 31, 2013 (machine translation and Japanese versions attached).
Machine translation of JP-2013-241586-A, published Dec. 5, 2013 (machine translation and Japanese versions attached).
Machine translation of JP-2014-125607-A, published Jul. 7, 2014 (machine translation and Japanese versions attached).
Machine translation of JP-2014-139303-A, published Jul. 31, 2014 (machine translation and Japanese versions attached).
Machine translation of JP-2014-141637-A, published Aug. 7, 2014 (machine translation and Japanese versions attached).
Machine translation of JP-2014-141658-A, published Aug. 7, 2014 (machine translation and Japanese versions attached).
Machine translation of JP-2015-93882-A, published May 18, 2015 (machine translation and Japanese versions attached).
Machine translation of JP-2015-98576-A, published May 28, 2015 (machine translation and Japanese versions attached).
International Search Report, issued in PCT/JP2016/053767; PCT/ISA/210, dated May 17, 2016.
Written Opinion of the International Searching Authority, issued in PCT/JP2016/053767, PCT/ISA/237, dated May 17, 2016.

* cited by examiner

50μm
Microfibrillated plant fiber 1

50μm
Microfibrillated plant fiber 2

METHOD FOR PRODUCING MASTER BATCH, MASTER BATCH OBTAINED BY SAID PRODUCTION METHOD, RUBBER COMPOSITION FOR TIRE, AND PNEUMATIC TIRE

TECHNICAL FIELD

The present invention relates to a method for producing a masterbatch, a masterbatch produced by the method, a rubber composition for tires, and a pneumatic tire.

BACKGROUND ART

Rubber compositions can be reinforced to show enhanced modulus (complex elastic modulus) by incorporating microfibrillated plant fibers such as cellulose fibers as filler into the rubber compositions. However, since microfibrillated plant fibers are highly self-aggregative and poorly compatible with rubber components, they show low dispersibility during rubber kneading. For this reason, the incorporation of microfibrillated plant fibers may deteriorate fuel economy or other properties. There is also a need for methods for improving the dispersibility of microfibrillated plant fibers.

Patent Literatures 1 to 4 disclose that rubber properties and other properties are improved by previously mixing cellulose fibers and a rubber latex to improve the dispersibility of the cellulose fibers. However, there is still room for improvement to further enhance the dispersibility of cellulose fibers in a masterbatch containing rubber and the cellulose fibers in order to improve rubber properties and other properties.

CITATION LIST

Patent Literature

Patent Literature 1: JP 2013-177540 A
Patent Literature 2: JP 2013-241586 A
Patent Literature 3: JP 2013-129767 A
Patent Literature 4: JP 4581116 B

SUMMARY OF INVENTION

Technical Problem

The present invention aims to solve the aforementioned problems and provide, inter alia, a method for producing a masterbatch in which the dispersibility of microfibrillated plant fibers is further increased to obtain excellent processability and improved rubber properties such as fuel economy, tensile strength, elongation at break, air permeation resistance, rigidity, tensile properties, adhesion performance, and resistance to tension set.

Solution to Problem

The present invention relates to a method for producing a masterbatch, the method including step (I) of mixing a rubber latex with microfibrillated plant fibers oxidized with an N-oxyl compound to obtain a mixture, and coagulating the mixture by adjusting its pH to 2 to 6.

The masterbatch preferably contains 10 to 50 parts by mass of the microfibrillated plant fibers per 100 parts by mass of a rubber component in the masterbatch.

Another aspect of the present invention is a masterbatch, produced by the above method.

Another aspect of the present invention is a rubber composition for tires, prepared from the above masterbatch.

Another aspect of the present invention is a pneumatic tire, formed from the above rubber composition.

Advantageous Effects of Invention

The method for producing a masterbatch of the present invention includes step (I) of mixing a rubber latex with microfibrillated plant fibers oxidized with an N-oxyl compound to obtain a mixture, and coagulating the mixture by adjusting its pH to 2 to 6. With this method, a rubber composition for tires and a pneumatic tire can be obtained which have excellent processability and improved rubber properties such as fuel economy, tensile strength, elongation at break, air permeation resistance, rigidity, tensile properties, adhesion performance, and resistance to tension set.

DESCRIPTION OF EMBODIMENTS

[Method for Producing Masterbatch]

Figure 1:
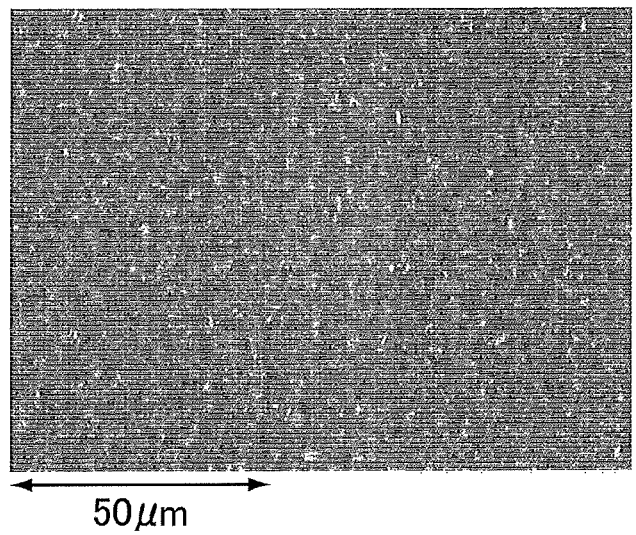
FIG. 1 is an electron microscope image showing the degree of dispersion of microfibrillated plant fibers 1 in a masterbatch.

The method for producing a masterbatch of the present invention includes step (I) of mixing a rubber latex with microfibrillated plant fibers oxidized with an N-oxyl compound to obtain a mixture, and coagulating the mixture by adjusting its pH to 2 to 6.

It is usually difficult to uniformly disperse microfibrillated plant fibers in a masterbatch. The production method including step (I) allows the fibers to be highly dispersed in rubber and also improves rubber properties. This is presumably because since the microfibrillated plant fibers oxidized with an N-oxyl compound have good dispersion efficiency in the rubber latex, the fibers are uniformly incorporated in the latex and therefore uniformly dispersed in the rubber. Particularly in the case where a natural rubber latex is used as the rubber latex, proteins, phospholipids, and other substances in the rubber are removed, and at the same time the fibers are uniformly dispersed, with the result that the rubber properties are significantly improved.

(Step (I))

In the present invention, step (I) is first performed which includes mixing a rubber latex with microfibrillated plant fibers oxidized with an N-oxyl compound to obtain a mixture, and coagulating the mixture by adjusting its pH to 2 to 6.

Any rubber latex may be used, and suitable examples include isoprene-based rubber latexes such as natural rubber latexes, modified natural rubber latexes such as saponified natural rubber latexes, epoxidized natural rubber latexes, and polyisoprene rubber latexes.

Suitable among isoprene-based rubber latexes are natural rubber latexes and modified natural rubber latexes such as saponified natural rubber latexes. Even when a usual natural rubber latex containing non-rubber components such as phosphorus or nitrogen is used, the non-rubber components can be sufficiently removed according to the present invention, without using a special rubber latex from which non-rubber components have been removed, such as saponified natural rubber latexes, because in the production method of the present invention, the natural rubber latex is combined with the microfibrillated plant fibers, and the mixture is coagulated by adjusting its pH to a predetermined range.

Natural rubber latexes are collected as sap of natural rubber trees such as hevea trees. They contain components such as water, proteins, lipids, and inorganic salts as well as the rubber component. The gel fraction in the rubber is considered to be a complex of various impurities. In the present invention, the natural rubber latex used may be, for example, a raw latex (field latex) taken from hevea trees by tapping, or a concentrated latex prepared by concentration via centrifugation or creaming (e.g., purified latex, high-ammonia latex prepared by adding ammonia in a conventional manner, or LATZ latex stabilized with zinc oxide, TMTD, and ammonia).

The rubber latex such as a natural rubber latex may directly be mixed with the microfibrillated plant fibers. Particularly in the case where a natural rubber latex is used, it may previously be saponified before use. The saponification can be carried out by adding to the natural rubber latex an alkali such as NaOH and optionally a surfactant, and leaving the mixture at a predetermined temperature for a certain period of time. Here, stirring or other operations may be performed as needed. The natural rubber particles in the form of a latex can be uniformly saponified, and therefore the saponification can be efficiently carried out. When saponification is performed, the phosphorous compounds isolated by the saponification are removed, and therefore the natural rubber in the masterbatch to be prepared has a reduced phosphorus content. Furthermore, the proteins in the natural rubber are decomposed by the saponification, and therefore the natural rubber also has a reduced nitrogen content.

Preferred examples of the alkali used in the saponification include sodium hydroxide and potassium hydroxide. Non-limiting examples of the surfactant include known nonionic, anionic, and amphoteric surfactants such as polyoxyethylene alkyl ether sulfates. Suitable are polyoxyethylene alkyl ether sulfates because they allow for suitable saponification without coagulating rubber. The amounts of the alkali and the surfactant used in the saponification and the temperature and duration of the saponification may be selected appropriately.

The microfibrillated plant fibers oxidized with an N-oxyl compound may suitably be fibers in which the primary hydroxy group on the sixth carbon atom of the pyranose ring of cellulose is oxidized to a carboxyl or aldehyde group and which have a cellulose I crystalline structure. Such specific microfibrillated plant fibers are disclosed in JP 2008-001728 A, for example.

The microfibrillated plant fibers are fibers obtained by surface oxidation in which the primary hydroxy group on the sixth carbon atom of the pyranose ring of cellulose is oxidized to a carboxyl or aldehyde group or a salt thereof, followed by microfibrillating the surface-oxidized cellulose. The term "pyranose ring" refers to a six-membered hydrocarbon ring consisting of five carbon atoms and one oxygen atom. The primary hydroxy group of the pyranose ring is selectively oxidized in the oxidation of cellulose with an N-oxyl compound. Specifically, natural cellulose is biosynthesized in the form of nanofibers which are gathered in large numbers by hydrogen bonding to form bundles of fibers. When such cellulose fibers are oxidized with an N-oxyl compound, the primary hydroxy group on the sixth carbon atom of the pyranose ring is selectively oxidized, and this oxidation occurs only on the surface of the microfibrils. As a result, carboxyl groups are densely introduced only into the surface of the microfibrils. Since the carboxyl groups carrying a negative charge repel each other, the aggregation of the microfibrils is prevented by dispersing them in water. Thus, the bundles of fibers are fibrillated into microfibrils to form cellulose nanofibers. In order to well achieve the effects of the present invention, it is preferred that the primary hydroxy group on the sixth carbon atom of the pyranose ring of cellulose is surface-oxidized to a carboxyl group.

The combined amount of carboxyl and aldehyde groups in the microfibrillated plant fibers is preferably 0.1 mmol/g or more, more preferably 0.2 mmol/g or more, but preferably 2.5 mmol/g or less, more preferably 2.2 mmol/g or less, based on the weight (absolute dry weight) of the cellulose fibers. A combined amount within the range indicated above leads to uniform dispersion of the nanofibers.

In the present invention, the combined amount is expressed by a charge density in the microfibrillated plant fibers. The term "absolute dry weight" means that the cellulose fibers constitute 100% of the total weight.

In particular, the amount of such carboxyl groups is preferably 0.1 mmol/g or more, more preferably 0.2 mmol/g or more, but preferably 2.4 mmol/g or less, more preferably 2.1 mmol/g or less, based on the weight (absolute dry weight) of the cellulose fibers. The introduction of carboxyl groups in an amount within the range indicated above causes electrical repulsion leading to fibrillation into microfibrils, with the result that nanofibers can be uniformly dispersed.

The microfibrillated plant fibers preferably have an average fiber length of 50 nm or more, more preferably 150 nm or more. The average fiber length is preferably 5,000 nm or less, more preferably 2,000 nm or less. When the average fiber length is less than 50 nm or more than 5,000 nm, the effects of the present invention may not be sufficiently achieved.

The microfibrillated plant fibers preferably have a maximum fiber diameter of 1,000 nm or less, more preferably 500 nm or less, still more preferably 30 nm or less. The lower limit of the maximum fiber diameter is not particularly limited. Fibers having a maximum fiber diameter of more than 1,000 nm are less likely to show nanofiber characteristics, and also have poor dispersibility, with the result that the effects of the present invention may not be sufficiently achieved.

The microfibrillated plant fibers preferably have a number average fiber diameter of 2 to 150 nm, more preferably 2 to 100 nm, still more preferably 2 to 10 nm, particularly preferably 2 to 5 nm. Having a number average fiber diameter within the range indicated above, the nanofibers can be uniformly dispersed.

The identification of the type I crystalline structure of the microfibrillated plant fibers and the determination of the amounts of aldehyde and carboxyl groups (mmol/g), the average fiber length, the maximum fiber diameter, and the number average fiber diameter can be carried out by known methods, for example as described in JP 2008-001728 A. In order to determine the number average fiber diameter and the average fiber length, cellulose nanofibers fixed to a piece of mica were observed (3,000 nm×3,000 nm) with a scanning probe microscope (available from Hitachi High-Tech Science Corporation). Fifty fibers were measured for fiber width to calculate a number average fiber diameter. The average fiber length was determined from the observed image using an image analysis software WinROOF (available from Mitani Corporation).

The microfibrillated plant fibers oxidized with an N-oxyl compound can be prepared by, for example, a method including: an oxidation step in which natural cellulose as a raw material is oxidized by the action of an N-oxyl compound as an oxidation catalyst and a co-oxidant in water to obtain reacted fibers; a purification step in which impurities are removed to obtain reacted fibers impregnated with water; and a dispersing step in which the water-impregnated, reacted fibers are dispersed in a solvent.

Firstly, in the oxidation step, a dispersion of natural cellulose in water is prepared. Examples of the natural cellulose include purified cellulose isolated from cellulose biosynthesis systems such as plants, animals, or gels produced by bacteria. The natural cellulose may be subjected to a treatment to increase the surface area, such as beating. Natural cellulose isolated, purified, and then stored in a never-dried condition may also be used. The dispersion medium of the natural cellulose in the reaction is water, and the concentration of the natural cellulose in the aqueous reaction solution is usually about 5% or lower.

The N-oxyl compound which can be used as an oxidation catalyst for cellulose refers to a compound that can form nitroxy radicals, and examples include heterocyclic nitroxy radical-forming compounds having C1-C4 alkyl groups at the a positions of an amino group as represented by the following formula (1):

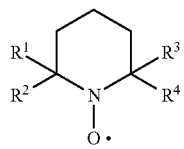
(1)

wherein $R^1$ to $R^4$ are the same as or different from each other and each represent a C1-C4 alkyl group.

Preferred among the nitroxy radical-forming compounds of formula (1) are 2,2,6,6-tetraalkylpiperidine-1-oxyl and derivatives thereof such as 4-hydroxy-2,2,6,6-tetraalkylpiperidine-1-oxyl, 4-alkoxy-2,2,6,6-tetraalkylpiperidine-1-oxyl, 4-benzoyloxy-2,2,6,6-tetraalkylpiperidine-1-oxyl, and 4-amino-2,2,6,6-tetraalkylpiperidine-1-oxyl. Among these, more preferred are 2,2,6,6-tetramethylpiperidine-1-oxyl (hereinafter, also referred to as TEMPO) and derivatives thereof such as 4-hydroxy-2,2,6,6-tetramethylpiperidine-1-oxyl (hereinafter, also referred to as 4-hydroxy TEMPO), 4-alkoxy-2,2,6,6-tetramethylpiperidine-1-oxyl (hereinafter, also referred to as 4-alkoxy TEMPO), 4-benzoyloxy-2,2,6,6-tetramethylpiperidine-1-oxyl (hereinafter, also referred to as 4-benzoyloxy TEMPO), and 4-amino-2,2,6,6-tetramethylpiperidine-1-oxyl (hereinafter, also referred to as 4-amino TEMPO). Derivatives of the foregoing compounds may also be used. Among these compounds, TEMPO is more preferred in terms of activity.

Examples of the derivative of 4-hydroxy TEMPO include derivatives obtained by etherification of the hydroxy group of 4-hydroxy TEMPO with an alcohol having a linear or branched carbon chain with four or less carbon atoms, and derivatives obtained by esterification of the hydroxy group of 4-hydroxy TEMPO with a carboxylic acid or sulfonic acid, such as compounds represented by the following formulas (2) to (4):

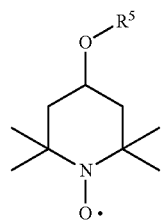
(2)

wherein $R^5$ represents a linear or branched carbon chain with four or less carbon atoms,

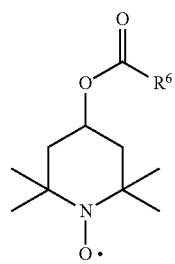
(3)

wherein $R^6$ represents a linear or branched carbon chain with four or less carbon atoms, and

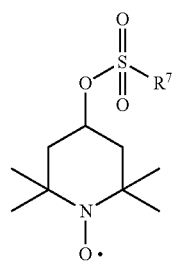
(4)

wherein $R^7$ represents a linear or branched carbon chain with four or less carbon atoms.

The derivative of 4-amino TEMPO is preferably 4-acetamide TEMPO represented by the formula (5) below in which the amino group of 4-amino TEMPO is acetylated to provide moderate hydrophobicity because it is inexpensive and can produce uniformly oxidized cellulose.

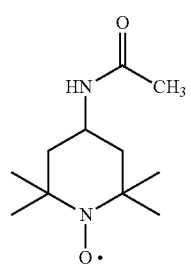
(5)

For efficient oxidation of cellulose in a short time, radicals of the N-oxyl compound represented by the formula (6) below, namely azaadamantane nitroxy radicals are also preferred.

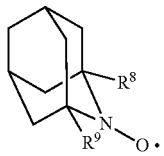

(6)

In formula (6), $R^8$ and $R^9$ are the same as or different from each other and each represent a hydrogen atom or a C1-C6 linear or branched alkyl group.

The N-oxyl compound may be added in any catalytic amount that allows the resulting oxidized cellulose to be sufficiently made into nanofibers. The amount of the N-oxyl compound per gram (absolute dry weight) of cellulose fibers is preferably 0.01 to 10 mmol/g, more preferably 0.01 to 1 mmol/g, still more preferably 0.025 to 0.5 mmol/g.

Examples of usable co-oxidants include hypohalous acids, halous acids, perhalic acids, and salts of these acids; hydrogen peroxide, and perorganic acids. Preferred are alkali metal salts of hypohalous acids. For example, when sodium hypochlorite is used, the reaction is preferably performed in the presence of an alkali metal bromide. The amount of the alkali metal bromide added per gram (absolute dry weight) of cellulose fibers is preferably 0.1 to 100 mmol/g, more preferably 0.1 to 10 mmol/g, still more preferably 0.5 to 5 mmol/g, while the amount of sodium hypochlorite added per gram (absolute dry weight) of cellulose fibers is preferably 0.5 to 500 mmol/g, more preferably 0.5 to 50 mmol/g, still more preferably 2.5 to 25 mmol/g.

The pH of the aqueous reaction solution is preferably maintained within a range of about 8 to 11. The temperature of the solution is about 4 to 40° C., for example at room temperature, and it is not particularly necessary to control the temperature. The amount of the co-oxidant added per gram (absolute dry weight) of cellulose fibers is preferably in the range of about 3.0 to 8.2 mmol/g.

In the purification step, the compounds contained in the reaction slurry, excluding the reacted fibers and water, such as unreacted hypochlorous acid and various by-products, are removed from the system. Common purification methods can be used. For example, a high purity (99% by mass or more) dispersion of the reacted fibers in water may be prepared by repeating water washing and filtration.

The purification step is followed by a dispersing treatment (dispersing step) in which the water-impregnated, reacted fibers (aqueous dispersion) obtained in the purification step are dispersed in a solvent to prepare a dispersion of the microfibrillated plant fibers. The solvent as a dispersion medium is usually preferably water. Examples of the solvent other than water include alcohols, ethers, and ketones, which are soluble in water. Examples of dispersers that can be used in the dispersing step include powerful beating devices such as general dispersers, high speed rotary homomixers, and high-pressure homogenizers.

The dispersion of the microfibrillated plant fibers is used as microfibrillated plant fibers oxidized with an N-oxyl compound. The microfibrillated plant fiber dispersion may be dried before use as microfibrillated plant fibers oxidized with an N-oxyl compound. The drying may be carried out by freeze drying, for example. Moreover, the microfibrillated plant fiber dispersion may be mixed with, as a binder, a compound having a very high boiling point and an affinity for cellulose, such as water-soluble polymers or saccharides, to allow the microfibrillated plant fibers to be dispersed in the form of nanofibers again in a solvent even when they are dried in a common manner. In this case, the amount of the binder added to the dispersion is desirably in the range of 10% to 80% by mass of the amount of the reacted fibers.

The dried microfibrillated plant fibers can be used as microfibrillated plant fibers oxidized with an N-oxyl compound after they are again mixed in a solvent followed by application of an appropriate dispersing force.

The microfibrillated plant fibers oxidized with an N-oxyl compound may directly be mixed with a rubber latex, but preferably the microfibrillated plant fibers in the form of a dispersion, such as the above-mentioned microfibrillated plant fiber aqueous solution (an aqueous solution in which the microfibrillated plant fibers are dispersed in water), are mixed with a rubber latex. The amount of the microfibrillated plant fibers (solid content) in the aqueous solution is preferably 0.2% to 20% by mass, more preferably 0.5% to 10% by mass, still more preferably 0.5% to 3% by mass.

The step of mixing a rubber latex with the microfibrillated plant fibers to prepare a mixture of them can be carried out, for example, by sequentially dropwise adding or injecting these materials, followed by mixing them by a known method.

The mixture is coagulated by adjusting its pH to 2 to 6, preferably 2 to 5, more preferably 3 to 4. The pH adjustment may be carried out by adding an acid or base, for example. Due to the pH adjusted to 2 to 6 upon coagulation, the rubber component in the resulting coagulum can be highly purified, even when it includes natural rubber. Specifically, non-rubber components such as proteins and phospholipids in natural rubber are removed so that the natural rubber is highly purified, resulting in improved fuel economy and processability. Moreover, the removal of non-rubber components and other treatments can accelerate deterioration of the rubber; however, when the pH is adjusted within a predetermined range upon coagulation, the decrease in the molecular weight of the rubber component during storage can be reduced so that good heat aging resistance can be obtained. Furthermore, a composite in which the microfibrillated plant fibers are uniformly dispersed in rubber can be produced. Accordingly, the dispersibility of the microfibrillated plant fibers is significantly enhanced to improve rubber properties.

The high purification of natural rubber means the removal of impurities other than natural polyisoprenoid components, such as phospholipids and proteins. The structure of natural rubber is just like isoprenoid components are covered with these impurity components. By removing the impurity components, the structure of isoprenoid components is altered to change their interaction with compounding agents, resulting in reduced energy loss and improved durability. It is presumably for this reason that a better masterbatch can be obtained.

The mixture may be coagulated by, for example, acid coagulation, salt coagulation, or methanol coagulation. In order to coagulate it to obtain a masterbatch in which the microfibrillated plant fibers are uniformly dispersed, acid coagulation, salt coagulation, or a combination thereof is preferred, with acid coagulation being more preferred. Examples of the acid for coagulation include formic acid, sulfuric acid, hydrochloric acid, and acetic acid. From the standpoint of cost, sulfuric acid is preferred. Examples of the salt include mono- to trivalent metal salts (e.g. sodium chloride, magnesium chloride, calcium salts such as calcium nitrate and calcium chloride).

If the mixture is rapidly coagulated, the microfibrillated plant fibers tend to be incorporated in the form of aggregates like fluff balls into the rubber latex, and therefore the microfibrillated plant fibers are less likely to disperse. For this reason, the mixture is preferably coagulated in conditions such that the microfibrillated plant fibers are slowly incorporated into the rubber latex. From this standpoint, the temperature of the mixture in the coagulation thereof is preferably 40° C. or lower, more preferably 35° C. or lower. From the same standpoint, the coagulant such as an acid, salt, or methanol as described above is preferably introduced stepwise (the entire amount is divided into portions and introduced).

(Step (II))

The coagulum (crumb containing coagulated rubber and the microfibrillated plant fibers) obtained in step (I) may be washed as needed. Accordingly, for example, in the case where a natural rubber latex is used as the rubber latex, the resulting coagulum is further washed so that the phosphorus content and the nitrogen content can be adjusted at more desired levels.

The washing may be carried out, for example, by diluting the rubber content with water and centrifuging the dilution, or by diluting the rubber content with water, leaving the dilution to allow the rubber to float or sediment, and then draining only the water phase. When an isoprene-based rubber latex is used, in the case of centrifugation, the latex may be firstly diluted with water to a rubber content of 5% to 40% by mass, preferably 10% to 30% by mass, followed by centrifugation at 5,000 to 10,000 rpm for 1 to 60 minutes. This washing may be repeated until the phosphorus content reaches a desired level. Alternatively, in the case where the dilution is left to allow the rubber to float or sediment, washing may also be carried out by repeating addition of water and stirring until the phosphorus content reaches a desired level.

The washing method is not limited to the above methods, and may be carried out by neutralizing the latex with weak alkali water such as sodium carbonate to a pH of 6 to 7, and then removing the liquid phase.

After washing, if necessary, the rubber is usually dried by a known method (e.g. in an oven or under reduced pressure). The dried rubber is kneaded with a two-roll mill, Banbury mixer, or other kneading machines, whereby a masterbatch crumb containing rubber and the microfibrillated plant fibers can be prepared. The masterbatch is preferably formed into a sheet having a thickness of a few centimeters with a rolling mill to improve the cohesiveness and handleability. The masterbatch may contain other components as long as the effects of the present invention are not inhibited.

[Masterbatch]

The rubber component (solid content) in the masterbatch prepared by the method of the present invention preferably has a phosphorus content of 200 ppm or less, more preferably 120 ppm or less. The phosphorus content can be measured by conventional methods such as ICP optical emission spectrometry. The phosphorus is derived from phospholipids (phosphorous compounds).

The rubber component (solid content) in the masterbatch preferably has a nitrogen content of 0.3% by mass or less, more preferably 0.15% by mass or less. When the nitrogen content exceeds 0.3% by mass, the Mooney viscosity tends to increase during storage, resulting in poor processability. In addition, fuel economy may deteriorate. The nitrogen content can be measured by conventional methods such as the Kjeldahl method. The nitrogen is derived from proteins.

In the masterbatch, the amount of the microfibrillated plant fibers per 100 parts by mass of the rubber component (solid content) is preferably 1 part by mass or more, more preferably 5 parts by mass or more, still more preferably 10 parts by mass or more. When the amount is less than 1 part by mass, the rubber composition containing the masterbatch unavoidably incorporates an excessively large amount of the above rubber component in order to ensure a necessary amount of the microfibrillated plant fibers, with the result that the rubber composition has a reduced crosslink density so that fuel economy may deteriorate. The amount of the microfibrillated plant fibers is also preferably 50 parts by mass or less, more preferably 30 parts by mass or less, still more preferably 20 parts by mass or less. When the amount is more than 50 parts by mass, the dispersibility of the microfibrillated plant fibers may decrease so that fuel economy and elongation at break may deteriorate.

[Rubber Composition for Tires]

The rubber composition for tires of the present invention contains the above-described masterbatch. The use of the masterbatch provides a rubber composition in which the microfibrillated plant fibers are uniformly dispersed in rubber. Therefore, the deterioration of rubber properties in the kneading step is prevented, and the dispersibility of filler and the like is enhanced, resulting in excellent fuel economy and improved tensile strength and elongation at break.

The amount of the rubber component derived from the masterbatch, based on 100% by mass of the total rubber component in the rubber composition of the present invention, is preferably 5% by mass or more, more preferably 10% by mass or more, still more preferably 15% by mass or more. When the amount is less than 5% by mass, the rubber composition contains too small an amount of the microfibrillated plant fibers, with the result that the effects of the present invention may not be sufficiently achieved.

In the rubber composition of the present invention, the amount of isoprene-based rubbers based on 100% by mass of the total rubber component is preferably 5% by mass or more, more preferably 10% by mass or more, still more preferably 15% by mass. When the amount is less than 5% by mass, excellent fuel economy may not be obtained.

Examples of rubbers other than isoprene-based rubbers that can be included in the total rubber component include polybutadiene rubber (BR), styrene butadiene rubber (SBR), ethylene propylene diene rubber (EPDM), chloroprene rubber (CR), acrylonitrile butadiene rubber (NBR), and butyl rubber (IIR). Particularly for use in sidewalls, the rubber composition preferably contains BR. For use in innerliners, the rubber composition preferably contains butyl rubber.

In the rubber composition of the present invention, the amount of the microfibrillated plant fibers per 100 parts by mass of the total rubber component is preferably 1 part by mass or more, more preferably 2 parts by mass or more, still more preferably 3 parts by mass or more. The amount of the microfibrillated plant fibers is also preferably 50 parts by mass or less, more preferably 30 parts by mass or less, still more preferably 20 parts by mass or less. When the amount is less than 1 part by mass, the incorporation of the microfibrillated plant fibers may not produce the effect. When the amount is more than 50 parts by mass, the dispersibility of the microfibrillated plant fibers may decrease so that the effects of the present invention may not be achieved.

In addition to the above-described materials, the rubber composition of the present invention may appropriately contain various materials commonly used in the tire industry. Examples include reinforcing fillers such as carbon black and silica, zinc oxide, stearic acid, various types of antioxidants, softeners such as oils and waxes, vulcanizing agents such as sulfur and organic peroxides, and vulcanization accelerators such as sulfenamide and guanidine vulcanization accelerators.

The rubber composition of the present invention may be prepared by known methods, such as by kneading the components using a rubber kneading machine such as an open roll mill or Banbury mixer, and then vulcanizing the kneadate.

The rubber composition of the present invention can be used in, for example, various tire components such as cap treads, base treads, undertreads, clinch apexes, bead apexes, sidewalls, breakers, edge bands, full bands, breaker cushion rubbers, carcass cord topping rubbers, run-flat reinforcing layers, insulations, chafers, and innerliners; belts, and rolls, and suitably in sidewalls and innerliners.

The tire of the present invention can be formed from the rubber composition by conventional methods. Specifically, the unvulcanized rubber composition containing materials as needed is extruded and processed into the shape of a tire component such as a sidewall or innerliner, and formed on a tire building machine in a usual manner to build an unvulcanized tire. The unvulcanized tire is heated and pressurized in a vulcanizer to produce a tire.

The tire of the present invention may be, for example, a pneumatic tire or an airless (solid) tire, preferably a pneumatic tire.

EXAMPLES

The present invention will be specifically described with reference to, but not limited to, examples below.

The chemicals used in the examples are listed below.

Bleached softwood kraft pulp: a product produced in the Iwakuni Mill of Nippon Paper Industries Co., Ltd.

TEMPO: 2,2,6,6-tetramethyl-1-piperidine-N-oxyradical (a compound of formula (1) wherein $R^1$ to $R^4$ are methyl groups) available from Evonik Sodium bromide: a product of Manac Incorporated Sodium hypochlorite: Cyclone available from Saitama Yakuhin Co., Ltd.

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (a butylated condensate of p-cresol and dicyclopentadiene) available from Eliokem Emulvin W (surfactant): Emulvin W (an aromatic polyglycol ether) available from Lanxess Tamol NN 9104 (surfactant): Tamol NN 9104 (a sodium salt of naphthalenesulfonic acid/formaldehyde) available from BASF Van gel B (surfactant): Van gel B (hydrated magnesium aluminum silicate) available from Vanderbilt Field latex: a field latex (natural rubber latex) available from Muhibbah Lateks Microfibrillated plant fibers 1 and 3 to 14: microfibrillated plant fibers prepared in the production examples described below (TEMPO-oxidized microfibrillated plant fibers)

Microfibrillated plant fiber 2: BiNFi-s T series (carboxymethylated cellulose nanofiber, number average fiber diameter: 20 to 50 nm, average fiber length: 500 to 1,000 nm) available from Sugino Machine Limited Microfibrillated plant fiber 15: BiNFi-s (fine cellulose fiber processed using an ultra high pressure water jet technology, number average fiber diameter: 20 to 50 nm, average fiber length: 500 to 1,000 nm) available from Sugino Machine Limited Microfibrillated plant fiber 16: Neofiber (number average fiber diameter: 0.1 to 1.2 mm, average fiber length: 0.2 to 1.2 mm) available from Oji Seitai Kaisha, Ltd.

Coagulant: 1% sulfuric acid available from Wako Pure Chemical Industries, Ltd.

NR: TSR20

Highly purified NR: a product prepared in the production example described below Butyl-based rubber: chlorobutyl HT1066 available from Exxon Mobil Corporation BR: BR150B (cis content: 95% by mass) available from Ube Industries, Ltd.

Carbon black N660: DIABLACK N660 ($N_2$SA: 28 $m^2/g$, DBP absorption: 84 mL/100 g) available from Mitsubishi Chemical Corporation Carbon black N550: DIABLACK N550 ($N_2$SA: 41 $m^2/g$, DBP absorption: 115 mL/100 g) available from Mitsubishi Chemical Corporation Antioxidant: NOCRAC 6C (N-phenyl-N'-(1,3-dimethylbutyl)-p-phenylenediamine) (6PPD) available from Ouchi Shinko Chemical Industrial Co., Ltd.

Resin: Marukarez T-100AS (C5 resin) available from Maruzen Petrochemical Co., Ltd.

Oil: Diana Process PA32 available from Idemitsu Kosan Co., Ltd.

Zinc oxide 1: Zinc oxide #2 available from Mitsui Mining & Smelting Co., Ltd.

Zinc oxide 2: Zinc oxide #1 available from Mitsui Mining & Smelting Co., Ltd.

Stearic acid: stearic acid beads "Tsubaki" available from NOF Corporation

Sulfur 1: Seimi sulfur (oil content: 10%) available from Nippon Kanryu Industry Co., Ltd.

Sulfur 2: powdered sulfur available from Karuizawa Sulfur

Vulcanization accelerator 1: NOCCELER NS (N-tert-butyl-2-benzothiazolylsulfenamide) available from Ouchi Shinko Chemical Industrial Co., Ltd.

Vulcanization accelerator 2: NOCCELER MBTS (dibenzothiazyl disulfide) available from Ouchi Shinko Chemical Industrial Co., Ltd.

EXAMPLES AND COMPARATIVE EXAMPLES

<Preparation of Masterbatches 1 to 8>
(Preparation of Microfibrillated Plant Fiber 1)

An amount in dry weight of 5.00 g of undried bleached softwood kraft pulp (mainly consisting of fibers having a diameter of more than 1,000 nm), 39 mg of TEMPO, and 514 mg of sodium bromide were dispersed in 500 mL of water. To the dispersion was added a 15% by mass sodium hypochlorite aqueous solution so that the mixture contained 5.5 mmol of sodium hypochlorite per gram (absolute dry weight) of the pulp, followed by starting a reaction. The pH during the reaction was maintained at 10.0 by adding dropwise a 3M aqueous NaOH solution. The reaction was considered to be completed when the pH no longer changed. The reaction product was filtrated through a glass filter and then subjected to five cycles of washing with plenty of water and filtration, thereby obtaining water-impregnated, reacted fibers with a solid content of 15% by mass.

Next, water was added to the reacted fibers to prepare a slurry with a solid content of 1% by mass.

To 4 g (absolute dry weight) of the oxidized cellulose were added 1.5 mL of 1M NaOH and 0.5 mL of 30% hydrogen peroxide water, and the concentration was adjusted to 5% (w/v) by adding ultrapure water. Thereafter, the mixture was heated for two hours at 80° C. in an autoclave.

The unwashed alkali-hydrolyzed, oxidized cellulose was treated three times in an ultra high pressure homogenizer (processing pressure: 140 MPa) to obtain a transparent gel dispersion (microfibrillated plant fiber 1).

The combined amount of carboxyl and aldehyde groups and the amount of carboxyl groups in the microfibrillated plant fibers were 1.6 mmol/g and 1.5 mmol/g, respectively, based on the weight of the cellulose fibers. The maximum fiber diameter and the number average fiber diameter were 8.2 nm and 4.0 nm, respectively. The average fiber length was 470 nm.

(Preparation of Highly Purified NR)

The solid concentration (DRC) of the field latex was adjusted to 30% (w/v). Then, 1,000 g of the latex was combined with 25 g of a 10% EMAL E-27C aqueous solution and 60 g of a 25% aqueous NaOH solution, and the mixture was saponified for 24 hours at room temperature to obtain a saponified natural rubber latex. Next, 6 g of the antioxidant dispersion described below was added and the mixture was stirred for two hours, followed by further adding water to dilute the mixture to a rubber concentration of 15% (w/v). Then, formic acid was added with slow stirring to adjust the pH to 4.0. Subsequently, a cationic polymer flocculant was added and the mixture was stirred for two minutes, so that coagulation occurred. The thus obtained coagulum (coagulated rubber) had a diameter of approximately 0.5 to 5 mm. The coagulum was taken out and immersed in 1,000 mL of a 2% by mass aqueous sodium carbonate solution for four hours at room temperature, and then the rubber was taken out. The rubber was combined with 2,000 mL of water and the mixture was stirred for two minutes and then dehydrated as much as possible. This cycle of operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, followed by stirring for two minutes. This cycle of operation was repeated three times. Then, water was squeezed off from the resultant rubber with a water squeezing roll to form a sheet, followed by drying for four hours at 90° C. to obtain a highly purified NR. The phosphorus content and the nitrogen content of the highly purified NR were 92 ppm and 0.07% by mass, respectively.

The antioxidant dispersion was prepared by mixing 462.5 g of water, 12.5 g of Emulvin W, 12.5 g of Tamol NN 9104, 12.5 g of Van gel B, and 500 g of Wingstay L (total 1,000 g) using a ball mill for 16 hours.

Example 1 (Masterbatch 1)

The dispersion of microfibrillated plant fiber 1 was diluted with water to a solid concentration of 0.5% (w/v) and treated in a high speed homogenizer (T25 available from IKA Japan, rotation speed: 8,000 rpm) for about 10 minutes to prepare a homogeneous dispersion (viscosity: 7 to 8 mPas).

The resulting microfibrillated plant fiber 1 dispersion was added to the field latex (solid concentration (DRC): 30% (w/v)) such that the dry weight (solid content) of microfibrillated plant fibers was 20 parts by mass per 100 parts by mass of the field latex. The mixture was stirred with a homogenizer (rotation speed: 8,000 rpm) for about five minutes to prepare a rubber latex dispersion. Then, the coagulant was added to the dispersion with slow stirring (Eurostar available from IKA Japan) to adjust the pH to 3 to 4 (a pH meter D51T available from Horiba, Ltd.) so that the dispersion was coagulated into crumbs, which were then dehydrated and dried at 40° C. for 12 hours to obtain masterbatch 1 (MB1).

Example 2 (Masterbatch 2)

Masterbatch 2 (MB2) was prepared as in Example 1, except that the dispersion of microfibrillated plant fiber 1 was added such that the dry weight (solid content) of microfibrillated plant fibers was 10 parts by mass.

Comparative Example 1 (Masterbatch 3)

Masterbatch 3 (MB3) was prepared as in Example 1, except that the dispersion of microfibrillated plant fiber 2 was used.

Comparative Example 2 (Masterbatch 4)

Masterbatch 4 (MB4) was prepared as in Comparative Example 1, except that the dispersion of microfibrillated plant fiber 2 was added such that the dry weight (solid content) of microfibrillated plant fibers was 10 parts by mass.

Example 3 (Masterbatch 5)

The dispersion of microfibrillated plant fiber 1 was diluted with water to a solid concentration of 0.5% (w/v) and treated in a high speed homogenizer (rotation speed: 8,000 rpm) for about 10 minutes to prepare a homogeneous dispersion (viscosity: 7 to 8 mPas).

The solid concentration (DRC) of the field latex was adjusted to 30% (w/v), and then 25 g of a 10% EMAL E-27C aqueous solution and 60 g of a 25% aqueous NaOH solution were added to 1,000 g of the latex, which was then saponified for 24 hours at room temperature to obtain a saponified natural rubber latex. The microfibrillated plant fiber 1 dispersion was added to the saponified natural rubber latex (solid concentration (DRC): 30% (w/v)) such that the dry weight (solid content) of microfibrillated plant fibers was 20 parts by mass per 100 parts by mass of the latex. The mixture was stirred with a homogenizer (rotation speed: 8,000 rpm) for about five minutes to prepare a rubber latex dispersion. Then, the coagulant was added to the dispersion with slow stirring to adjust the pH to 3 to 4 so that the dispersion was coagulated into crumbs, which were then dehydrated and dried at 40° C. for 12 hours to obtain masterbatch 5 (MB5).

Example 4 (Masterbatch 6)

Masterbatch 6 (MB6) was prepared as in Example 3, except that the dispersion of microfibrillated plant fiber 1 was added such that the dry weight (solid content) of microfibrillated plant fibers was 10 parts by mass.

Comparative Example 3 (Masterbatch 7)

Masterbatch 7 (MB7) was prepared as in Example 3, except that the dispersion of microfibrillated plant fiber 2 was used.

Comparative Example 4 (Masterbatch 8)

Masterbatch 8 (MB8) was prepared as in Comparative Example 3, except that the dispersion of microfibrillated plant fiber 2 was added such that the dry weight (solid content) of microfibrillated plant fibers was 10 parts by mass.

MB1 to MB8 were evaluated for the ratio of the rubber latex and the microfibrillated plant fibers incorporated and the physical properties of the rubber component as described below. Table 1 shows the results.

<Measurement of Viscosity of Microfibrillated Plant Fibers>

Brookfield viscosity (60 rpm, 20° C.) was measured with a viscometer TV-10 available from Toki Sangyo Co., Ltd.

<Measurement of Nitrogen Content>

Nitrogen content was determined by gas chromatography after pyrolysis.

<Measurement of Phosphorus Content>

Phosphorus content was determined using an ICP emission spectrometer (P-4010, Hitachi, Ltd.).

<Rolling Resistance>

The loss tangent (tan δ) of each formulation example (vulcanizate) was measured using a viscoelastic spectrometer VES (Iwamoto Seisakusho Co., Ltd.) at a temperature of 70° C., an initial strain of 10%, a dynamic strain of 1%, and a frequency of 10 Hz. Rolling resistance indexes were calculated according to the equation below, where the reference comparative example was set equal to 100. A lower rolling resistance index indicates a smaller rolling resistance and is thus preferred.

(Rolling resistance index)=(tan δ of each formulation example)/(tan δ of reference comparative example)×100

<Tensile test>

Tensile strength and elongation at break were measured in accordance with JIS K 6251 "Rubber, vulcanized or thermoplastics, Determination of tensile stress-strain properties". Tensile strength indexes and elongation at break indexes were calculated according to the following equations:

TABLE 1

| Production Example | | Type of rubber latex | Type of fiber | Amount of fibers per 100 parts by mass of rubber component (phr) | pH upon coagulation | Rubber component in masterbatch | |
|---|---|---|---|---|---|---|---|
| | | | | | | Phosphorus content (ppm) | Nitrogen content (% by mass) |
| MB1 | Example 1 | Natural rubber latex | Microfibrillated plant fiber 1 | 20 | 3 | 95 | 0.13 |
| MB2 | Example 2 | Natural rubber latex | Microfibrillated plant fiber 1 | 10 | 4 | 90 | 0.12 |
| MB3 | Comparataive Example 1 | Natural rubber latex | Microfibrillated plant fiber 2 | 20 | 3 | 93 | 0.11 |
| MB4 | Comparataive Example 2 | Natural rubber latex | Microfibrillated plant fiber 2 | 10 | 4 | 92 | 0.12 |
| MB5 | Example 3 | Saponified natural rubber latex | Microfibrillated plant fiber 1 | 20 | 3 | 79 | 0.08 |
| MB6 | Example 4 | Saponified natural rubber latex | Microfibrillated plant fiber 1 | 10 | 4 | 80 | 0.08 |
| MB7 | Comparataive Example 3 | Saponified natural rubber latex | Microfibrillated plant fiber 2 | 20 | 3 | 76 | 0.07 |
| MB8 | Comparataive Example 4 | Saponified natural rubber latex | Microfibrillated plant fiber 2 | 10 | 4 | 79 | 0.08 |

Figure 2:
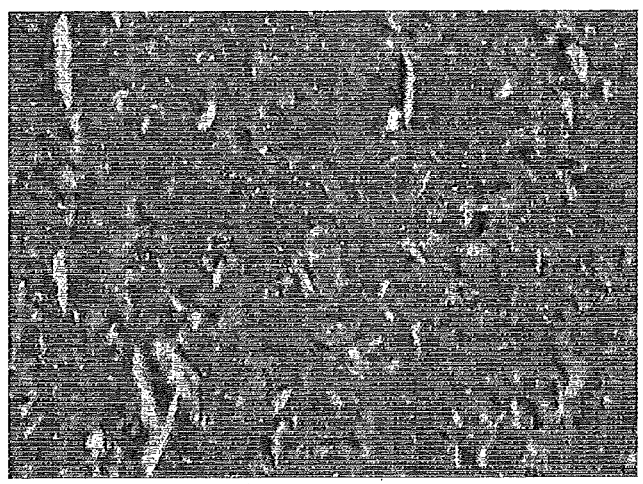
FIG. 2 is an electron microscope image showing the degree of dispersion of microfibrillated plant fibers 2 in a masterbatch.

Table 1 and FIGS. 1 and 2 show that when microfibrillated plant fiber 1 was used, the dispersibility of microfibrillated plant fibers was better and the nitrogen content and phosphorus content of the rubber component were lower than when microfibrillated plant fiber 2 was used. The microfibrillated plant fiber exhibited further better dispersibility when it was mixed with a saponified natural rubber latex.

<Preparation of Vulcanized Rubber Composition>

According to each of the formulations shown in Tables 2 and 3, the chemicals other than the sulfur and vulcanization accelerator were kneaded using a 1.7 L Banbury mixer (Kobe Steel, Ltd.). Then, the kneadate was kneaded with the sulfur and vulcanization accelerator using an open roll mill to obtain an unvulcanized rubber composition. Next, the unvulcanized rubber composition was pressed in a 2 mm-thick mold for 30 minutes at 150° C. to obtain a vulcanized rubber composition. The unvulcanized rubber compositions and vulcanized rubber compositions prepared as above were evaluated as described below. Tables 2 and 3 show the results. Comparative Examples 5 and 7 were used as reference comparative examples.

Tensile strength index=(Stress at break of each formulation example)/(Stress at break of reference comparative example)×100, Elongation at break index=(Elongation at break of each formulation example)/(Elongation at break of reference comparative example)×100).

A higher index indicates that the vulcanized rubber composition was better reinforced and had higher rubber mechanical strength and better rubber properties.

TABLE 2

| | | Natural rubber latex-containing formulation | | | |
|---|---|---|---|---|---|
| | | Example | | Comparataive Example | |
| | | 5 | 6 | 5 | 6 |
| Formulation (parts by mass) | MB1 | 60 | — | — | — |
| | MB2 | — | 110 | — | — |
| | MB3 | — | — | 60 | — |
| | MB4 | — | — | — | 110 |

TABLE 2-continued

Natural rubber latex-containing formulation

|  |  | Example | | Comparataive Example | |
|---|---|---|---|---|---|
|  |  | 5 | 6 | 5 | 6 |
|  | NR | 50 | — | 50 | — |
|  | Antioxidant | 3 | 3 | 3 | 3 |
|  | Zinc oxide 1 | 2 | 2 | 2 | 2 |
|  | Stearic acid | 1.5 | 1.5 | 1.5 | 1.5 |
|  | Sulfur 1 | 1.67 | 1.67 | 1.67 | 1.67 |
|  | Vulcanization accelerator 1 | 1 | 1 | 1 | 1 |
| Evaluation | Tensile strength index | 107 | 111 | 100 | 100 |
|  | Elongation at break index | 113 | 116 | 100 | 98 |
|  | Rolling resistance index | 50 | 47 | 100 | 90 |

TABLE 3

Saponified natural rubber latex-containing formulation

|  |  | Example | | Comparataive Example | |
|---|---|---|---|---|---|
|  |  | 7 | 8 | 7 | 8 |
| Formulation (parts by mass) | MB5 | 60 | — | — | — |
|  | MB6 | — | 110 | — | — |
|  | MB7 | — | — | 60 | — |
|  | MB8 | — | — | — | 110 |
|  | Highly purified NR | 50 | — | 50 | — |
|  | Antioxidant | 3 | 3 | 3 | 3 |
|  | Zinc oxide 1 | 2 | 2 | 2 | 2 |
|  | Stearic acid | 1.5 | 1.5 | 1.5 | 1.5 |
|  | Sulfur 1 | 1.67 | 1.67 | 1.67 | 1.67 |
|  | Vulcanization accelerator 1 | 1 | 1 | 1 | 1 |
| Evaluation | Tensile strength index | 121 | 126 | 100 | 100 |
|  | Elongation at break index | 118 | 119 | 100 | 98 |
|  | Rolling resistance index | 46 | 44 | 100 | 90 |

Tables 2 and 3 demonstrate that in the examples using MB1, MB2, MB5, or MB6, fuel economy, tensile strength, and elongation at break were improved while obtaining excellent dispersion of microfibrillated plant fibers. These properties were further improved particularly in the examples using MB5 or MB6 containing a saponified natural rubber latex.

<Preparation of Masterbatches 9 to 29>

Microfibrillated plant fibers 3 to 16 were prepared according to the above-described method for preparing microfibrillated plant fiber 1 while appropriately adjusting the amount of the oxidizing agent added, the concentration or amount of NaOH added to the oxidized cellulose, and the time of reaction in the autoclave to obtain fibers having a number average fiber diameter, average fiber length, and combined amount of carboxyl and aldehyde groups in the microfibrillated plant fibers based on the weight of the cellulose fibers as shown in Table 4.

The obtained dispersions of microfibrillated plant fibers were diluted with water to a solid concentration of 1% (w/v) and treated in a high speed homogenizer (rotation speed: 8,000 rpm) for about 10 minutes to prepare homogeneous dispersions.

Each resultant microfibrillated plant fiber dispersion was added to the field latex (solid concentration (DRC): 30% (w/v)) such that the dry weight (solid content) of microfibrillated plant fibers was 20 or 10 parts by mass per 100 parts by mass of the field latex. The mixture was stirred with a homogenizer (rotation speed: 15,000 rpm) for about five minutes to prepare a rubber latex dispersion. Then, the coagulant was added to the dispersion with slow stirring to adjust the pH to 3 to 4 so that the dispersion was coagulated into crumbs, which were then dehydrated and dried in an oven at 60° C. for 12 hours. In this manner, masterbatches 9 to 23 (MB9 to MB23) shown in Table 4 were prepared.

Moreover, masterbatches 24 to 29 (MB24 to MB29) containing microfibrillated plant fiber 15, 2, or 16 were prepared as comparative examples. They are also shown in Table 4.

TABLE 4

|  |  |  |  | Amount of fibers per 100 parts by mass of rubber component (phr) | pH upon coagulation | Microfibrillated plant fiber | | |
|---|---|---|---|---|---|---|---|---|
|  | Production Example | Type of rubber latex | Type of fiber |  |  | Number average fiber diameter (nm) | Average fiber length (nm) | Charge density (mmol/g) |
| MB9 | Example 9 | Natural rubber latex | Microfibrillated plant fiber 3 | 20 | 4 | 4.0 | 1000 | 1 |
| MB10 | Example 10 | Natural rubber latex | Microfibrillated plant fiber 4 | 20 | 3 | 4.0 | 1060 | 1.3 |
| MB11 | Example 11 | Natural rubber latex | Microfibrillated plant fiber 5 | 20 | 3 | 3.0 | 1040 | 1.6 |
| MB12 | Example 12 | Natural rubber latex | Microfibrillated plant fiber 6 | 20 | 4 | 4.0 | 780 | 2 |
| MB13 | Example 13 | Natural rubber latex | Microfibrillated plant fiber 7 | 20 | 4 | 4.0 | 650 | 1 |
| MB14 | Example 14 | Natural rubber latex | Microfibrillated plant fiber 8 | 20 | 4 | 4.0 | 550 | 1.3 |
| MB15 | Example 15 | Natural rubber latex | Microfibrillated plant fiber 9 | 20 | 3 | 4.0 | 470 | 1.6 |

TABLE 4-continued

| Production Example | Type of rubber latex | Type of fiber | Amount of fibers per 100 parts by mass of rubber component (phr) | pH upon coagulation | Microfibrillated plant fiber Number average fiber diameter (nm) | Average fiber length (nm) | Charge density (mmol/g) |
|---|---|---|---|---|---|---|---|
| MB16 | Example 16 Natural rubber latex | Microfibrillated plant fiber 10 | 20 | 4 | 3.0 | 420 | 2 |
| MB17 | Example 17 Natural rubber latex | Microfibrillated plant fiber 11 | 20 | 3 | 4.0 | 390 | 1 |
| MB18 | Example 18 Natural rubber latex | Microfibrillated plant fiber 12 | 20 | 4 | 4.0 | 390 | 1.3 |
| MB19 | Example 19 Natural rubber latex | Microfibrillated plant fiber 13 | 20 | 4 | 4.0 | 340 | 1.6 |
| MB20 | Example 20 Natural rubber latex | Microfibrillated plant fiber 14 | 20 | 4 | 4.0 | 300 | 2 |
| MB21 | Example 21 Natural rubber latex | Microfibrillated plant fiber 5 | 10 | 4 | 3.0 | 1040 | 1.6 |
| MB22 | Example 22 Natural rubber latex | Microfibrillated plant fiber 9 | 10 | 4 | 4.0 | 470 | 1.6 |
| MB23 | Example 23 Natural rubber latex | Microfibrillated plant fiber 13 | 10 | 4 | 4.0 | 340 | 1.6 |
| MB24 | Comparataive Example 9 Natural rubber latex | Microfibrillated plant fiber 15 | 20 | 4 | 20 to 50 | 1040 | — |
| MB25 | Comparataive Example 10 Natural rubber latex | Microfibrillated plant fiber 2 | 20 | 3 | 20 to 50 | 500 to 1000 | — |
| MB26 | Comparataive Example 11 Natural rubber latex | Microfibrillated plant fiber 16 | 20 | 4 | 0.1 to 1.2 (mm) | 0.2 to 1.2 (mm) | — |
| MB27 | Comparataive Example 12 Natural rubber latex | Microfibrillated plant fiber 15 | 10 | 4 | 20 to 50 | 1040 | — |
| MB28 | Comparataive Example 13 Natural rubber latex | Microfibrillated plant fiber 2 | 10 | 4 | 20 to 50 | 500 to 1000 | — |
| MB29 | Comparataive Example 14 Natural rubber latex | Microfibrillated plant fiber 16 | 10 | 4 | 0.1 to 1.2 (mm) | 0.2 to 1.2 (mm) | — |

<Preparation of Rubber Composition for Innerliners and Rubber Composition for Sidewalls>

According to each of the formulations shown in Tables 5 and 6, the chemicals other than the sulfur and vulcanization accelerator were kneaded using a 1.7 L Banbury mixer (Kobe Steel, Ltd.). Then, the kneadate was kneaded with the sulfur and vulcanization accelerator using an open roll mill to obtain an unvulcanized rubber composition. Next, the unvulcanized rubber composition was pressed in a 2 mm-thick mold for 30 minutes at 150° C. to obtain a vulcanized rubber composition. The vulcanized rubber compositions and vulcanized rubber compositions prepared as above were evaluated as described below. Tables 5 and 6 show the results. Comparative Examples 16 and 19 were used as reference comparative examples.

<Air Permeation Resistance>

Rubber specimens having a diameter of 90 mm and a thickness of 1 mm were prepared from each vulcanized rubber composition. The air permeability coefficient (cc·cm/cm²·sec/cmHg) of the specimens was determined in accordance with ASTM D-1434-75M and expressed as an index (air permeation resistance index) using the equation below, with the reference comparative example taken as reference (=100). A higher index indicates less air permeation and better air permeation resistance.

(Air permeation resistance index)=(Air permeability coefficient of reference comparative example)/(Air permeability coefficient of each formulation example)×100

<Tensile properties>

No. 6 dumbbell specimens prepared from each vulcanized rubber composition were subjected to tensile testing at 25° C. in accordance with JIS K 6251:2010 to determine the tensile strength TB (MPa) and the elongation at break EB (%). Then, breaking energy was determined by calculating TB×EB (MPa·%)/2. The breaking energy of each formulation example is expressed as an index, with the reference comparative example set equal to 100. A higher index indicates better tensile properties.

<Rolling Resistance>

The loss tangent (tan δ) of each formulation example (vulcanizate) was measured using a viscoelastic spectrometer VES (Iwamoto Seisakusho Co., Ltd.) at a temperature of 70° C., an initial strain of 10%, a dynamic strain of 1%, and a frequency of 10 Hz. Rolling resistance indexes were calculated according to the equation below, where the reference comparative example was set equal to 100. A lower rolling resistance index indicates a smaller rolling resistance and is thus preferred.

(Rolling resistance index)=(tan δ of each formulation example)/(tan δ of reference comparative example)×100

<Building Processability>

The Mooney viscosity ML(1+4) at 130° C. of the unvulcanized rubber composition was measured in accordance with JIS K 6300. The unvulcanized rubber composition was formed into a sheet and then visually observed for scorch characteristics and flatness as sheet processability. An overall assessment of these processability items is expressed as an index, with the reference comparative example set equal to 100. An index of lower than 100 indicates inferior building processability because the formed rubber does not have a stable thickness.

<Adhesion Performance>

Each vulcanized rubber composition was subjected to a tack test (measurement of adhesive force) using a tack tester produced in accordance with JIS T 9233. The values are expressed as an index using the equation below, with the reference comparative example set equal to 100. A higher index indicates better adhesion performance.

(Adhesion performance index)=(Tack test value of each formulation example)/(Tack test value of reference comparative example)×100

<Rigidity>

The complex elastic modulus E* (MPa) of each vulcanized rubber composition was measured using a viscoelastic spectrometer VES (Iwamoto Seisakusho Co., Ltd.) at a temperature of 70° C., a frequency of 10 Hz, an initial strain of 10%, and a dynamic strain of 2%. The E* values are expressed as an index using the equation below, with the reference comparative example set equal to 100. A higher index indicates greater rigidity.

(Rigidity index)=(E* of each formulation example)/(E* of reference comparative example)×100

<Resistance to Tension Set>

In accordance with JIS K 6273, specimens prepared from each vulcanized rubber composition were elongated to a specified extent and then allowed to freely contract in an atmosphere of 25° C. Then, residual elongation was measured to determine tension set under constant elongation. The results are expressed as an index, with the reference comparative example set equal to 100. A higher index indicates better resistance to tension set.

TABLE 5

Rubber composition for innerliners

| | | Example | | | | | | Comparataive Example | | |
|---|---|---|---|---|---|---|---|---|---|---|
| | | 24 | 25 | 26 | 27 | 28 | 29 | 15 | 16 | 17 |
| Formulation (parts by mass) | Masterbatch | MB9 | MB11 | MB12 | MB15 | MB16 | MB19 | MB24 | MB25 | MB26 |
| | (Amount) | (24) | (24) | (24) | (24) | (24) | (24) | (24) | (24) | (24) |
| | Rubber content | 20 | 20 | 20 | 20 | 20 | 20 | 20 | 20 | 20 |
| | Fiber content | 4 | 4 | 4 | 4 | 4 | 4 | 4 | 4 | 4 |
| | Butyl-based rubber | 80 | 80 | 80 | 80 | 80 | 80 | 80 | 80 | 80 |
| | Carbon black N660 | 60 | 60 | 60 | 60 | 60 | 60 | 60 | 60 | 60 |
| | Antioxidant | 3 | 3 | 3 | 3 | 3 | 3 | 3 | 3 | 3 |
| | Resin | 5 | 5 | 5 | 5 | 5 | 5 | 5 | 5 | 5 |
| | Oil | 7 | 7 | 7 | 7 | 7 | 7 | 7 | 7 | 7 |
| | Zinc oxide 2 | 2 | 2 | 2 | 2 | 2 | 2 | 2 | 2 | 2 |
| | Stearic acid | 2 | 2 | 2 | 2 | 2 | 2 | 2 | 2 | 2 |
| | Sulfur 2 | 0.5 | 0.5 | 0.5 | 0.5 | 0.5 | 0.5 | 0.5 | 0.5 | 0.5 |
| | Vulcanization accelerator 2 | 1 | 1 | 1 | 1 | 1 | 1 | 1 | 1 | 1 |
| Evaluation | Air permeation resistance | 110 | 110 | 133 | 129 | 105 | 100 | 97 | 100 | 97 |
| | Tensile properties | 103 | 102 | 105 | 106 | 108 | 111 | 91 | 100 | 91 |
| | Rolling resistance | 85 | 87 | 88 | 87 | 86 | 87 | 104 | 100 | 109 |
| | Building processability | 111 | 111 | 111 | 111 | 111 | 111 | 100 | 100 | 100 |
| | Adhesion performance | 118 | 118 | 118 | 118 | 118 | 118 | 94 | 100 | 88 |

TABLE 6

Rubber composition for sidewalls

| | | Example | | | Comparataive Example | | |
|---|---|---|---|---|---|---|---|
| | | 30 | 31 | 32 | 18 | 19 | 20 |
| Formulation (parts by mass) | Masterbatch | MB21 | MB22 | MB23 | MB27 | MB28 | MB29 |
| | (Amount) | (55) | (55) | (55) | (55) | (55) | (55) |
| | Rubber content | 50 | 50 | 50 | 50 | 50 | 50 |
| | Fiber content | 5 | 5 | 5 | 5 | 5 | 5 |
| | BR | 50 | 50 | 50 | 50 | 50 | 50 |
| | Carbon black N550 | 53 | 53 | 53 | 53 | 53 | 53 |
| | Antioxidant | 3 | 3 | 3 | 3 | 3 | 3 |
| | Oil | 7 | 7 | 7 | 7 | 7 | 7 |
| | Zinc oxide 2 | 3 | 3 | 3 | 3 | 3 | 3 |
| | Stearic acid | 2.5 | 2.5 | 2.5 | 2.5 | 2.5 | 2.5 |
| | Sulfur 2 | 1.5 | 1.5 | 1.5 | 1.5 | 1.5 | 1.5 |
| | Vulcanization accelerator 2 | 0.7 | 0.7 | 0.7 | 0.7 | 0.7 | 0.7 |
| Evaluation | Rigidity | 118 | 109 | 105 | 95 | 100 | 109 |
| | Tensile properties | 106 | 112 | 118 | 94 | 100 | 95 |
| | Rolling resistance | 91 | 90 | 86 | 104 | 100 | 107 |
| | Building processability | 125 | 125 | 125 | 100 | 100 | 100 |
| | Resistance to tension set | 129 | 143 | 136 | 86 | 100 | 79 |

Tables 4, 5, and 6 demonstrate that the rubber compositions of the examples each of which contained a masterbatch prepared from specific microfibrillated plant fibers exhibited excellent processability and improved fuel economy, air permeation resistance, rigidity, tensile properties, adhesion performance, and resistance to tension set while obtaining excellent dispersion of the microfibrillated plant fibers.

The invention claimed is:

1. A method for producing a masterbatch, the method comprising:
   mixing a rubber latex with microfibrillated plant fibers oxidized with an N-oxyl compound to obtain a mixture, and
   coagulating the mixture by adjusting the mixture pH to 3 to 5 to produce the masterbatch,
   wherein the masterbatch comprises 10 to 20 parts by mass of the microfibrillated plant fibers per 100 parts by mass of a rubber component in the masterbatch.

2. The method according to claim 1, wherein the mixture is coagulated by adjusting the pH to 3 to 4.

3. A masterbatch, produced by the method according to claim 1.

4. A method for producing a rubber composition for tires, which comprises preparing the rubber composition from the masterbatch according to claim 3.

5. A method for producing a pneumatic tire, which comprises forming the pneumatic tire from the rubber composition obtained by the method for producing a rubber composition according to claim 4.

* * * * *